(12) United States Patent
Chu

(10) Patent No.: US 9,903,245 B2
(45) Date of Patent: Feb. 27, 2018

(54) SYSTEM FOR COOLING VEHICLE SCR AND METHOD FOR CONTROLLING THE SAME

(71) Applicants: Hyundai Motor Company, Seoul (KR); Kia Motors Corporation, Seoul (KR)

(72) Inventor: Ji Ro Chu, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 56 days.

(21) Appl. No.: 14/930,467

(22) Filed: Nov. 2, 2015

(65) Prior Publication Data

US 2016/0153336 A1 Jun. 2, 2016

(30) Foreign Application Priority Data

Dec. 2, 2014 (KR) .................. 10-2014-0170191

(51) Int. Cl.
*F01N 3/00* (2006.01)
*F01N 3/20* (2006.01)
(Continued)

(52) U.S. Cl.
CPC .......... *F01N 3/2066* (2013.01); *F01N 3/208* (2013.01); *F01P 5/12* (2013.01); *F01P 7/162* (2013.01); *F01N 2260/024* (2013.01); *F01N 2610/02* (2013.01); *F01N 2610/11* (2013.01); *F01N 2610/1453* (2013.01); *F01N 2900/12* (2013.01); *F01N 2900/1811* (2013.01);
(Continued)

(58) Field of Classification Search
CPC .. F01N 3/2066; F01N 3/208; F01N 2260/024; F01N 2610/02; F01N 2610/11; F01N 2610/1453; F01N 2900/12; F01N 2900/1811; F01N 2900/1812; F01N 2900/1821; F01P 5/12; F01P 7/162
See application file for complete search history.

(56) References Cited

U.S. PATENT DOCUMENTS 6,513,323 B1 * 2/2003 Weigl ................. B01D 53/9431
137/340
2004/0103862 A1 * 6/2004 Aidnik .................... F01P 7/164
123/41.29
(Continued)

FOREIGN PATENT DOCUMENTS

JP 2007-132313 A 5/2007
JP 2008-274885 A 11/2008
(Continued)

*Primary Examiner* — Laert Dounis
*Assistant Examiner* — Matthew T Largi
(74) *Attorney, Agent, or Firm* — Morgan, Lewis & Bockius LLP

(57) ABSTRACT

A system for cooling a vehicle selective catalytic reduction (SCR) may include an electronic control clutch water pump configured to circulate coolant to cool a vehicle engine, a controller configured to perform ON/OFF control of the electronic control clutch water pump when cooling of the SCR system is required in addition to the engine cooling, and a coolant circulation pathway provided in the SCR system so that the coolant associated with operation of the electronic control water pump or the electronic control clutch water pump circulates.

4 Claims, 3 Drawing Sheets

(51) Int. Cl.
  *F01P 5/12*  (2006.01)
  *F01P 7/16*  (2006.01)
(52) U.S. Cl.
  CPC .............. *F01N 2900/1812* (2013.01); *F01N 2900/1821* (2013.01); *Y02T 10/24* (2013.01)

(56) References Cited

U.S. PATENT DOCUMENTS

| | | | | |
|---|---|---|---|---|
| 2009/0127265 | A1* | 5/2009 | Magnusson | F01N 3/2066 220/564 |
| 2010/0242439 | A1* | 9/2010 | Domon | B01D 53/9431 60/274 |
| 2012/0137991 | A1* | 6/2012 | Pae | F01P 7/164 123/41.1 |
| 2013/0000729 | A1* | 1/2013 | Mokire | F01N 3/2066 137/1 |

FOREIGN PATENT DOCUMENTS

| | | | |
|---|---|---|---|
| JP | 2009-97479 | A | 5/2009 |
| JP | 2009-216028 | A | 9/2009 |
| JP | 2010-242645 | A | 10/2010 |
| JP | 2010-275961 | A | 12/2010 |
| JP | 2011-149396 | A | 8/2011 |
| JP | 2014-5738 | A | 1/2014 |

* cited by examiner

SYSTEM FOR COOLING VEHICLE SCR AND METHOD FOR CONTROLLING THE SAME

CROSS-REFERENCE TO RELATED APPLICATION

The present application claims priority to Korean Patent Application No. 10-2014-0170191 filed Dec. 2, 2014, the entire contents of which is incorporated herein for all purposes by this reference.

BACKGROUND OF THE INVENTION

Field of the Invention

The present invention relates to a system for cooling a vehicle selective catalytic reduction (SCR) and a method for controlling the same. More particularly, it relates to a system for cooling a vehicle SCR and a method for controlling the same configured to be able to easily cool the SCR system using an electric or electronic control clutch water pump, when a diesel particulate filter (DPF), SCR and the like are mounted on an exhaust side of a diesel engine.

Description of Related Art

In an exhaust pipe of a diesel engine, a diesel oxidation catalyst (DOC) or a diesel particulate filter (DPF) as a kind of an exhaust gas after-treatment device for removing a particulate matter (PM) in the exhaust gas by physical collection and combustion, and a selective catalytic reduction (SCR) catalyst for effectively removing NOx are continuously installed.

The SCR catalyst system is configured so that urea injected into the exhaust pipe is thermally decomposed by heat of the exhaust pipe or is subjected to catalytic cracking while coming into contact with the SCR catalyst, an element of one molecule is converted into ammonia having two molecules, and the converted ammonia is used for the selective catalytic reduction (SCR) reaction with the nitrogen oxides in the exhaust gas, thereby being able to discharge harmless nitrogen and water as products of the reaction result to the outside.

In other words, the SCR catalyst system is a system which can effectively reduce NOx by injecting urea as a kind of the reducing agent into the SCR catalyst, and refers to a method of reducing NOx by injecting urea into the SCR catalyst, by the use of an SCR injection nozzle module as a kind of injector which is installed at the SCR catalyst inlet in the exhaust pipe.

At this time, when the temperature of the DPF and SCR catalyst or the like rises due to the regeneration process of the DPF system, since the temperature of the SCR injection nozzle module, and the peripheral heat damage parts such as a urea hose, a connector and a wiring rises by the conductive heat, there is a problem that melting or explosion can occur due to the heat damage.

Accordingly, there is a need for a means that can easily cool the SCR injection nozzle module and the peripheral heat damage parts for injecting the urea.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for cooling the vehicle SCR and a method for controlling the same configured to be able to easily cool the SCR system, by cooling the SCR system including the SCR injection nozzle module and its peripheral heat damage parts by utilizing an electronic control clutch water pump mounted in an engine room of a vehicle, so that the electric water pump is actuated when satisfying the condition for cooling the SCR system and at the same time the engine coolant is circulated in the SCR system.

According to various aspects of the present invention, a system for cooling a vehicle selective catalytic reduction (SCR) may include an electronic control clutch water pump configured to circulate coolant to cool a vehicle engine, a controller configured to perform ON/OFF control the electronic control clutch water pump when cooling of the SCR system is required in addition to the engine cooling, and a coolant circulation pathway provided in the SCR system so that the coolant associated with operation of the electronic control water pump or the electronic control clutch water pump circulates.

The coolant circulation pathway may include a first coolant circulation pathway that is formed inside a SCR injection nozzle module forming the SCR system so that the coolant can circulate, and a second coolant circulation pathway configured to be formed inside a urea tank so that the coolant can circulate.

According to various aspects of the present invention, a method for controlling a system for cooling a vehicle selective catalytic reduction (SCR) may include i) setting control factors for determining whether the SCR system is cooled, ii) determining, by a controller, whether cooling conditions of the SCR system are satisfied based on the control factors, iii) driving and controlling, by the controller, an electronic control clutch water pump when it is determined that there is a need to cool the SCR system, and iv) cooling, by the controller, of the SCR system in which the coolant associated with the operation of the electronic control clutch water pump circulates along a coolant circulation pathway provided in the SCR system.

At the setting control factors, the control factors may be set to include a tip temperature of the SCR injection nozzle module, an ambient temperature, a SCR injection quantity, a urea tank temperature and a DPF regeneration state.

At the determining whether cooling conditions of the SCR system are satisfied, it may be determined that there is a need to cool the SCR system, when the tip temperature of the SCR injection nozzle module is greater than a set value, the ambient temperature is greater than the set value, the SCR injection quantity is smaller than the set value, the urea tank temperature is smaller than the set value or diesel particulate filter (DPF) regeneration is in progress.

Through the means for solving the problems mentioned above, the present invention provides the following effects.

First, it is possible to easily cool the urea injection nozzle module and its peripheral heat damage parts, by the direct circulation and supply of the engine coolant to the urea injection nozzle module and the urea tank in the muffler room by the use of the electric water pump mounted on the vehicle.

Second, unlike causing a rise in costs or the like by installing a separate cooling means (such as a cooling fan and a separate coolant supply motor), since an electric water pump mounted on the vehicle is used as it is, it is possible to cool the urea injection nozzle module and its peripheral heat damage parts, without additional costs.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

First, the original function of the electric water pump will be described to aid the understanding of the present invention.

Figure 3:
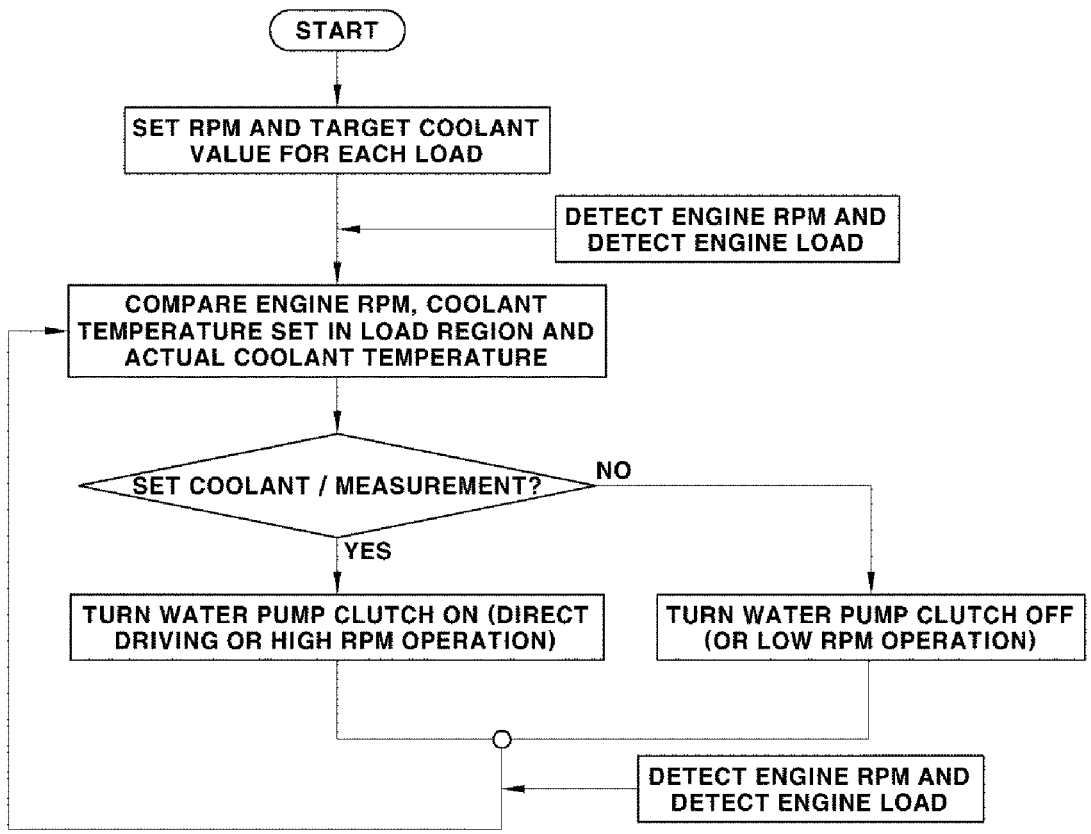
FIG. 3 is a flowchart showing the original function of the electric water pump that is adopted in the exemplary system for cooling the vehicle SCR according to the present invention.

Accompanying FIG. 3 is a flowchart showing the original function of the electric water pump.

In a state of setting the engine RPM and the target coolant temperature value for each load, the engine RPM, the target coolant temperature value set for each load and the actual coolant temperature value are compared.

As a result of the comparison, if the actual coolant temperature is smaller than the value of the target coolant temperature, by turning on the clutch of the electric water pump to drive the electric water pump, the actual coolant temperature is raised to the target coolant temperature together with the engine cooling by the forced coolant circulation.

In this way, the electric water pump is driven through the control of the electronic clutch for adjusting the temperature of the engine coolant to the target coolant temperature.

The present invention is based on the fact in which the driving conditions of the electric water pump as described above are changed to conditions capable of cooling the SCR system, when satisfying the conditions for cooling of the SCR system, the electric or electronic control clutch water pump is actuated, and simultaneously the engine coolant is allowed to circulate in the SCR system, thereby being able to easily cool the SCR system.

For reference, the electronic control clutch water pump refers to a variable flow rate control water pump in which a clutch capable of performing ON/OFF control by ECU is installed in the water pump pulley so as to be able to reduce the driving force of the water pump by turning the clutch of the pulley OFF in a low cooling load section and reduce the fuel consumption by increasing the temperature of the average coolant of the engine and the temperature of oil.

Figure 1:
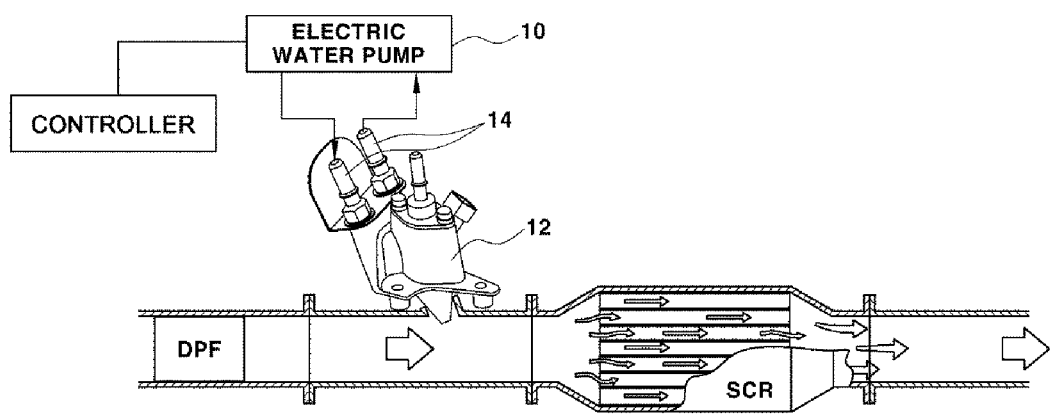
FIG. 1 is a block diagram showing an exemplary system for cooling the vehicle SCR according to the present invention.

Accompanying FIG. 1 is a block diagram showing a system for cooling the vehicle SCR according to the present invention.

As shown in FIG. 1, coolant inlet and outlet of the electronic control clutch water pump 10 are connected to a first coolant circulation pathway 14 formed inside the SCR injection nozzle module 12 so that the coolant can be circulated. Although it is not shown, coolant inlet and outlet of the electronic control clutch water pump 10 are connected to a second coolant circulation pathway formed inside the urea tank so that the coolant can be circulated.

Thus, when there is a need to cool the SCR system in addition to the engine cooling, by driving and controlling the electronic control clutch water pump 10 by a controller, the coolant associated with the operation of the electronic control clutch water pump 10 circulates through the first coolant circulation pathway 14 formed inside the coolant SCR injection nozzle module 12 and the second coolant circulation pathway formed in the urea tank.

In this way, by directly circulating and supplying the engine coolant to the SCR injection nozzle module and the urea tank in the muffler room using the electric water pump, it is possible to easily cool the SCR injection nozzle module and its peripheral heat damage parts.

Figure 2:
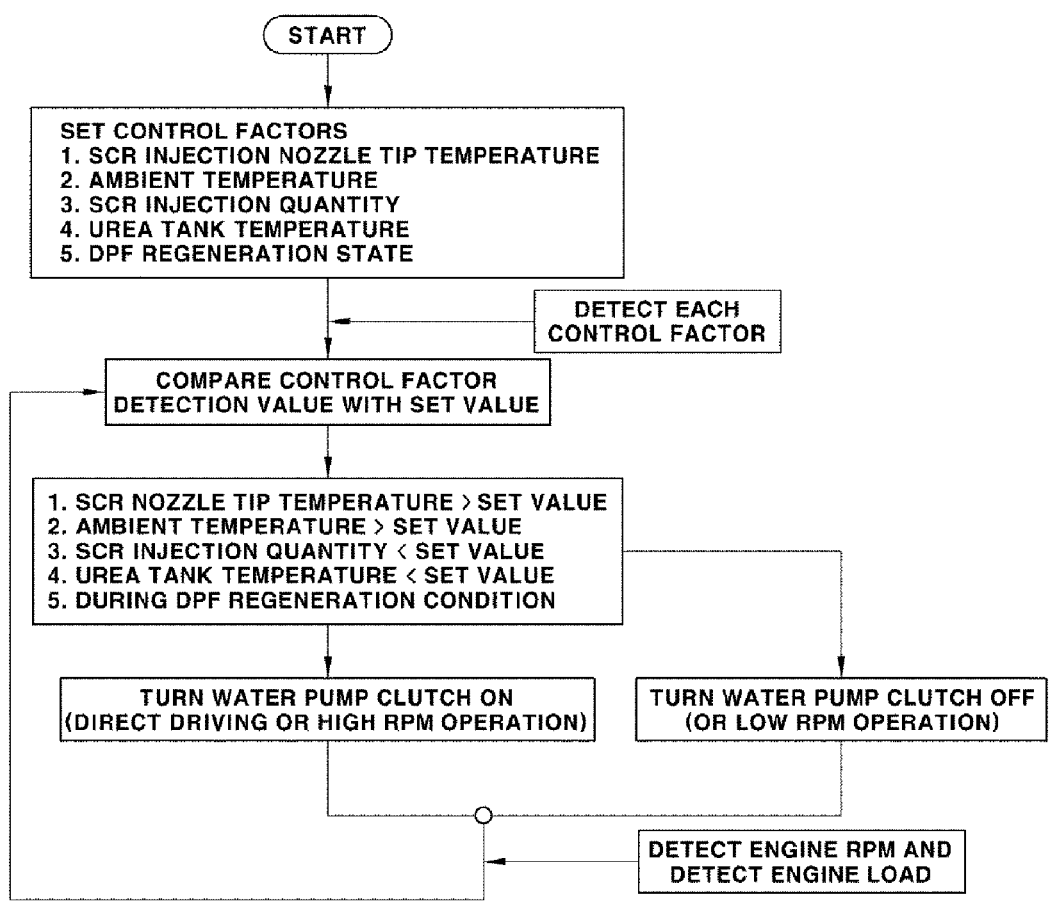
FIG. 2 is a flowchart showing an exemplary method for controlling the system for cooling the vehicle SCR according to the present invention.

Here, the operation process of the system for cooling the vehicle SCR based on the above-described configuration will be described as follows:

Accompanying FIG. 2 is a flowchart showing a method for controlling the system for cooling the vehicle SCR according to the present invention.

First, the control factors for determining whether to cool the SCR system will be described.

That is, as the control factors for determining whether to cool the SCR system, the tip temperature of the SCR injection nozzle module, the ambient temperature, the SCR injection quantity, the temperature of the urea tank, and the DPF regeneration state are set.

Next, it is determined whether the cooling conditions of the SCR system are satisfied based on each control factor, and if it is determined that there is a need to cool the SCR system, the controller drives and controls the electric water pump.

More specifically, if the tip temperature of the SCR injection nozzle module is greater than the set value, the ambient temperature is greater than the set value, the SCR injection quantity is smaller than the set value, the temperature of the urea tank is smaller than the set value, or the DPF regeneration is in progress, the controller determines that it is required to cool the SCR system so that the electric water pump is driven by turning the clutch of the electric water pump on.

At this time, since the conductive heat generated during regeneration of the DPF is transmitted into the muffler room in which the SCR system exists, the temperature of the SCR injection nozzle module and the peripheral heat damage parts also rise due to the temperature rise of the muffler chamber.

For example, if it is determined that the tip temperature of the SCR injection nozzle module is about 400° C. or higher, the ambient temperature is 35° C. or higher, the SCR injection quantity is 7 mg/sec or less, the temperature of the urea tank is 0° C. or less or the DPF regeneration is in progress, the water pump is driven by turning the clutch of the electronic control clutch water pump on.

Therefore, the coolant associated with the operation of the water pump circulates along the coolant circulation pathway provided in the SCR system to cool the SCR system.

That is, by driving and controlling the water pump using the controller, the coolant associated with the operation of the electric water pump circulates through the first coolant circulation pathway formed inside the SCR injection nozzle module and the second coolant circulation pathway formed in the urea tank, and thus, the SCR injection nozzle module and the urea tank is easily cooled by the engine coolant.

In this way, it is possible to prevent the heat damage of the SCR injection nozzle module, the urea tank, and the peripheral heat damage parts, and it is possible to lower the internal temperature of the muffler room in which the SCR system exists.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for cooling a vehicle selective catalytic reduction (SCR) comprising:
    an electronic control clutch water pump configured to circulate coolant to cool a vehicle engine;
    a controller configured to perform engagement control of a clutch of the electronic control clutch water pump when cooling of an SCR system is required in addition to the engine cooling and determine whether cooling conditions of the SCR system are satisfied based on control factors; and
    a coolant circulation pathway provided in the SCR system so that the coolant associated with engagement control of the clutch in the electronic control clutch water pump circulates,
    wherein the control factors are set to include a tip temperature of a SCR injection nozzle module, an ambient temperature, a SCR injection quantity, a urea tank temperature and a DPF regeneration state.

2. The system for cooling the vehicle SCR of claim 1, wherein the coolant circulation pathway comprises a first coolant circulation pathway that is formed inside the SCR injection nozzle module forming the SCR system so that the coolant can circulate, and a second coolant circulation pathway configured to be formed inside a urea tank so that the coolant can circulate.

3. A method for controlling a system for cooling a vehicle selective catalytic reduction (SCR), the method comprising:
    i) setting control factors for determining whether the SCR system is cooled;
    ii) determining, by a controller, whether cooling conditions of the SCR system are satisfied based on the control factors;
    iii) engaging, by the controller, a clutch of an electronic control clutch water pump when it is determined that there is a need to cool the SCR system; and
    iv) cooling, by the controller, of the SCR system in which the coolant associated with the electronic control clutch water pump circulates along a coolant circulation pathway provided in the SCR system,
    wherein the control factors are set to include a tip temperature of a SCR injection nozzle module, an ambient temperature, a SCR injection quantity, a urea tank temperature and a DPF regeneration state.

4. The method of claim 3, wherein at the determining whether cooling conditions of the SCR system are satisfied, it is determined that there is a need to cool the SCR system, when the tip temperature of the SCR injection nozzle module is greater than a set value, the ambient temperature is greater than the set value, the SCR injection quantity is smaller than the set value, the urea tank temperature is smaller than the set value or diesel particulate filter (DPF) regeneration is in progress.

* * * * *